May 19, 1970     P. T. GALÁN     3,512,633
PERFECTED PACKING FOR TRANSPORT AND STORAGE OF
INDUSTRIAL CINEMATOGRAPHIC FILM
AND ANY OTHER COILABLE MATERIAL
Filed July 18, 1968
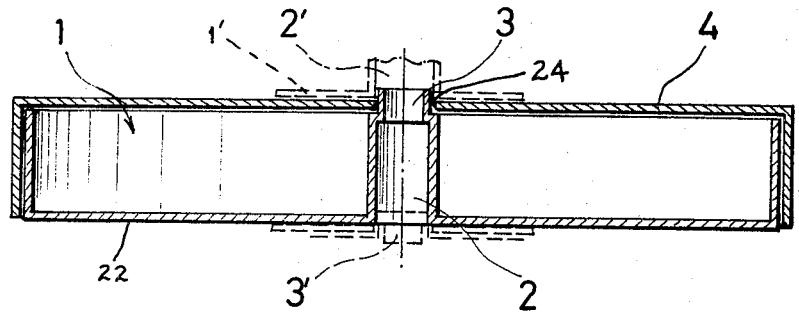
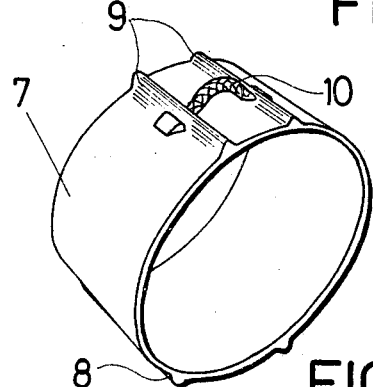
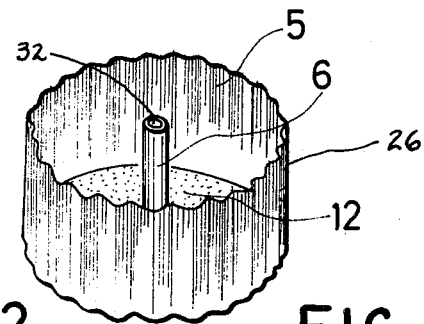
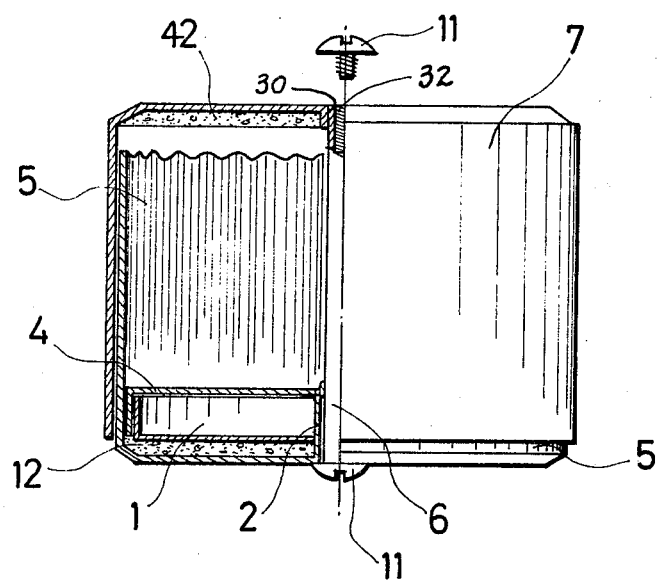
INVENTOR
PLÁCIDO TORO GALÁN
BY *Silverman & Cass*
ATTORNEYS

United States Patent Office 3,512,633
Patented May 19, 1970

---

3,512,633
PERFECTED PACKING FOR TRANSPORT AND STORAGE OF INDUSTRIAL CINEMATOGRAPHIC FILM AND ANY OTHER COILABLE MATERIAL
Plácido Toro Galán, San Jerónimo 36, Granada, Spain
Filed July 18, 1968, Ser. No. 745,825
Claims priority, application Spain, Nov. 25, 1967, 134,220
Int. Cl. B65d 85/67
U.S. Cl. 206—52    7 Claims

ABSTRACT OF THE DISCLOSURE

A cylindrical canister for retaining a plurality of loaded cinematographic film encasements in orderly fashion for storage and protection. The canister is provided with a protective corrugated encasement for retaining the film reels and protecting the same during handling of the canister. The film reels are constructed to permit orderly stacking of the same about a central post positioned on the interior of the canister.

BACKGROUND OF THE INVENTION

This invention relates, generally, to containers or packages for the storage and protection of coilable material and, more particularly, to a package or container assembly for the storage and protection of cinematographic film.

Cinematographic film is known to require delicate handling both in storage and in transportation. Such film must be subjected to a minimal amount of exposure to light and physical contact in order to maintain proper quality for use with a film projector. Further, it is important that such film be maintained in as near a controlled climate as possible since both heat and humidity affect the quality thereof.

Heretofore, such film has been retained for transportation and storage in containers of the fiberglass type which are usually suitable for retaining but one reel of coilable film. Containers known in the art do not permit the convenient storage of more than one reel of such film. Furthermore, prior art structures commonly do not provide the necessary insulation and protective encasing which is necessary for storage and transportation of a plurality of such film reels.

It is thus a primary object of the invention to provide a novel cinematographic film storage container which successfully eliminates the disadvantages inherent in prior art structures.

It is a further object of the invention to provide a structure which will retain a plurality of coiled cinematographic film encasements within a storage and transportation canister, the encasements each having a hollow central axle about which the film is wound, such structure having protective and insulating features which isolate the packaged film from outside weather conditions, thus preserving the contents of the container in desirable condition.

A further object of this invention is to provide a structure suitable for retaining a plurality of stackable film encasements in a condition which prevents the containers from being jostled and disturbed while the same are being transported in an outer canister.

The foregoing and other objects and advantages of the invention will become apparent from the ensuing disclosure in which a preferred embodiment of the invention is described in detail and illustrated in the accompanying drawing. It is contemplated that minor variations in structural features and arrangement of parts thereof may occur to the skilled artisan without departing from the scope or sacrificing any of the advantages of the invention.

BRIEF DESCRIPTION OF THE DRAWING

FIG. 1 is a sectional view taken longitudinally through an individual encasement for coilable film material constructed in accordance with the invention.

FIG. 2 is a perspective view of the cover portion of a film encasement canister constructed in accordance with the invention.

FIG. 3 is a perspective view of a film encasement canister constructed in accordance with the invention.

FIG. 4 is a side elevational view of an assembled film encasement canister, portions being in section to show one such film encasement positioned therein.

DESCRIPTION OF THE PREFERRED EMBODIMENT

Referring to the drawing, there is illustrated in FIG. 1 an individual film encasement 1 of generally cylindrical configuration having an upper cover portion or lid 4 and a lower film retaining portion 22. The film retaining portion 22 is slightly less in radial dimension than the lid portion for to permit the said lid portion to be placed in covering position over the said film retaining portion. The film retaining portion 22 has a central hollow axle 2 or hub passing therethrough. The upper portion 3 of the hollow axle 2 is of smaller radial or reduced diameter dimension than that of the main portion of the said axle 2. Portion 3 is of such dimension that its outer diameter is substantially the same as the inner diameter of the main portion of the tubular axle 2. An aperture 24 is provided in cover lid 4 to permit passage of the reduced diameter portion 3 of the tubular axle 2.

The construction of the axle 2 of the film encasement 1 is such that a plurality of film encasements 1 conveniently may be stacked one above the other for the orderly retention of the same. Thus, there is illustrated in FIG. 1 a portion of a second film encasement 1' stacked above the encasement 1. The central hollow axle 2' of the film encasement 1' receives the upper portion 3 of axle 2 in nested configuration. In such manner, it is obvious that a multiplicity of such film encasements 1 could be stacked one above other with each upper portion 3, 3', 3", etc., received within the hollow central axle 2, 2', 2", etc. of the next preceding film encasement.

Looking now at FIGS. 2 and 3, there is shown a film encasement canister 5 of generally cylindrical configuration having a corrugated side wall 26 and an insulated floor 12. The insulation 12 may be constructed of cork, rubber, or any other spongy material suitable for the purpose of insulation and protection of the contents of the canister 5. The side wall 26 preferably is constructed of a material such as aluminum or sheet metal which will retain its shape in use. A central post 6 is positioned normal to the floor of the encasement canister 5 and extends substantially the height of the corrugated side wall 26. The construction of the encasement canister 5 is such as to permit disposition of the individual film encasement 1 within the confines of the said encasement canister. The central post 6 is of outer diameter substantially the same as the inner diameter of the upper portion 3 of axle 2. Thus, the film encasement 1 conveniently may be inserted within the encasement canister 5 by sliding the central post 6 within the axle 2 until the floor of the film retaining portion 22 rests adjacent the insulating material 12. Likewise, a second film encasement 1' may be inserted above the encasement 1 within the encasement canister 5 in a similar fashion such that the bottom of film retaining portion 22' rests above the cover 4 of the encasement 1.

When the encasement canister 5 completely is filled with film encasements 1, 1', 1", etc., and storage or transportation is desired, the encasement cover 7 is positioned over the encasement canister 5 as illustrated in FIG. 4. Encasement cover 7 is of such dimension as to permit sliding of the said cover over the cansister 5. A layer of insulating material 42 is provided in the upper portion of cover 7 to provide further insulation and protection for the contents of the canister 5. An aperture 30 is provided in the upper portion of cover 7 coincidental with the center of post 6. Post 6 has a bored aperture 32 provided therein to receive a screw 11 for retaining the cover 7 upon the canister 5.

The cover 7 is provided with stabilizing ribs 8 and 9 which permit convenient standing of the encasement canister on its side. A handle 10 is provided to permit carrying of the said canister.

It will be understood that although the apparatus disclosed is particularly suitable for the storage and transportion of cinematographic film, it is also useful for the storage or transportation of any other coilable material. Due to the characteristics of the apparatus, the coilable material is retained within a protective encasement which retains the coils securely upon an axle preventing damage to the material by jarring and at the same time, isolating the said material from outside temperatures. The individual film encasements are securely retained about the central post 32 within the encasement canister 5 which forms an interior air chamber further facilitating protection of the contents of the encasements from adverse temperatures and conditions.

It is believed that the invention has been sufficiently described and illustrated to enable the skilled artisan to understand and practice the same. The invention has been distinctly pointed out in the appended claims intended to be broadly and liberally construed.

What it is desired to secure by Letters Patent of the United States is:

1. A package assembly for retaining coiled material in insulated condition comprising a coiled material encasement of generally cylindrical configuration having a coiled material retaining portion and a cover portion, said cover portion having an aperture centrally positioned thereon, stacking means within said encasement permissive of stacking a plurality of encasements one above the other, said stacking means comprising a central hollow axle about which said material is wound, a portion of said axle projecting through said aperture beyond said cover, the portion extending beyond said cover being of smaller outer diameter than the inner diameter of the axle such that the said projecting portion is adapted to be nested within the axle of the next adjacent encasement for stacking of the same, and means for retaining a plurality of said encasements in orderly, insulated condition for the protection of said encasements and the contents thereof.

2. A package assembly as claimed in claim 1 in which said means for retaining a plurality of encasements comprises an encasement canister of substantially cylindrical configuration, said canister having an axial post positioned centrally thereof, said hollow axle being adapted to permit passage of said axial post therethrough, and a canister cover adapted to be positioned over said canister to completely enclose the contents of said canister.

3. A package assembly as claimed in claim 2 in which said canister has a corrugated side wall and an insulated floor.

4. A package assembly as claimed in claim 2 in which said canister cover has a plurality of stabilizing ribs on the outer surface thereof to permit said means for retaining the plurality of encasements to stand on its side.

5. A package assembly as claimed in claim 1 in which said coiled material is cinematographic film.

6. In combination, an apparatus for retaining coiled material in insulated condition comprising a plurality of coiled material encasements of generally cylindrical configuration having a material retaining portion and a cover portion, the material retaining portion including a centrally located hollow axle with a portion of said axle projecting through said cover portion, the portion of said axle projecting through said cover portion being of smaller outer diameter than the inner diameter of the axle and being adapted to nest within the axle of a next adjacent encasement, an encasement canister, said canister including a central post for passage through said axles of said encasements for retaining said encasements in stacked condition.

7. Apparatus as claimed in claim 6 in which said canister has a corrugated side wall and an insulated floor and a canister cover for completely enclosing the contents of said canister.

References Cited

UNITED STATES PATENTS

| | | |
|---|---|---|
| 1,840,822 | 1/1932 | Ross. |
| 2,151,025 | 3/1939 | Goldberg. |
| 2,389,495 | 11/1945 | Forssell. |

JAMES B. MARBERT, Primary Examiner